(12) United States Patent
Despault et al.

(10) Patent No.: US 7,138,037 B2
(45) Date of Patent: Nov. 21, 2006

(54) PRESS FELT WITH BASE FABRIC LAYER WHICH INCLUDES REGENERATED CELLULOSIC FIBERS

(75) Inventors: Marc P. Despault, Ottawa (CA); Brady S. Patterson, Kanata (CA)

(73) Assignee: AstenJohnson, Inc., Charleston, SC (US)

( * ) Notice: Subject to any disclaimer, the term of this patent is extended or adjusted under 35 U.S.C. 154(b) by 110 days.

(21) Appl. No.: 10/918,075

(22) Filed: Aug. 12, 2004

(65) Prior Publication Data

US 2005/0136770 A1    Jun. 23, 2005

Related U.S. Application Data

(60) Provisional application No. 60/532,194, filed on Dec. 23, 2003.

(51) Int. Cl.
*D21F 7/08* (2006.01)
*B32B 5/08* (2006.01)
*B32B 5/26* (2006.01)

(52) U.S. Cl. .................... 162/358.2; 162/900; 442/270; 442/271; 442/274; 442/324; 442/213; 442/217; 442/2; 442/5; 442/50

(58) Field of Classification Search ............... 162/116, 162/117, 205, 206, 358.1, 358.2, 348, 900, 162/902, 903, 904; 139/383 A, 425 A, 383 AA; 442/182, 268, 270–275, 301, 328, 329, 381, 442/383, 389, 392, 402, 403, 407, 414, 415, 442/320–326, 361, 2, 5, 35, 36, 50, 57, 209, 442/213, 215, 217
See application file for complete search history.

(56) References Cited

U.S. PATENT DOCUMENTS

| | | | |
|---|---|---|---|
| 3,392,079 A | 7/1968 | Fekete | |
| 4,162,190 A | 7/1979 | Ashworth | |
| 4,323,622 A | 4/1982 | Gladh et al. | |
| 4,439,481 A | 3/1984 | Johnson et al. | |
| 4,520,059 A * | 5/1985 | Worrall et al. | 428/109 |
| 4,529,643 A | 7/1985 | Lundstrom | |
| 4,781,967 A * | 11/1988 | Legge et al. | 428/109 |

(Continued)

FOREIGN PATENT DOCUMENTS

EP    1 413 673    4/2004

(Continued)

OTHER PUBLICATIONS

Wahlstrom, B., 1960. *A Long Term Study of Water Removal and Moisture Distribution on a Newsprint Machine Press Section*. Paper presented at 46th Annual Meeting Technical Section, Canadian Pulp and Paper Association (Montreal, QC, Jan. 26-29, 1960), pp. 271-327.

(Continued)

*Primary Examiner*—Eric Hug
(74) *Attorney, Agent, or Firm*—Volpe and Koenig, PC

(57) ABSTRACT

A press felt for use in the press section of a papermaking machine is provided. The press felt includes a base fabric layer and at least one layer of a staple fiber batt material connected thereto. The press felt has a paper side surface (PS) which when in operation is in contact with a paper web conveyed thereon and a machine side surface (MS) which contacts various press section components. The base fabric layer includes a regenerated cellulosic component in either or both the MD and CD yarns. Regenerated cellulosic fibers may also be provided in the batt and/or scrims located in the batt to improve dewatering when compared to similarly constructed felts which lack this regenerated cellulosic material.

22 Claims, 2 Drawing Sheets

U.S. PATENT DOCUMENTS

| | | | |
|---|---|---|---|
| 5,135,802 | A | 8/1992 | Gstrein et al. |
| 5,204,171 | A | 4/1993 | Eschmann |
| 5,232,768 | A | 8/1993 | Eklund et al. |
| 5,268,076 | A | 12/1993 | Best et al. |
| 5,328,757 | A | 7/1994 | Kenney et al. |
| 5,360,656 | A | 11/1994 | Rexfelt et al. |
| 5,864,931 | A | 2/1999 | Best et al. |
| 6,140,260 | A * | 10/2000 | Johnson et al. ............. 442/270 |
| 6,159,880 | A | 12/2000 | Schiel |
| 6,171,446 | B1 | 1/2001 | Diaz-Kotti |
| 6,592,636 | B1 | 7/2003 | Joyce |
| 6,616,812 | B1 | 9/2003 | Beck |

FOREIGN PATENT DOCUMENTS

| | | |
|---|---|---|
| GB | 2 332 916 | 7/1999 |
| JP | 2 992 767 | 12/1999 |
| JP | 2005256227 | 9/2005 |
| WO | WO 99/32715 | 7/1999 |
| WO | WO 01/27387 | 4/2001 |
| WO | WO 03/023106 | 2/2003 |

OTHER PUBLICATIONS

Morrison, R.E. 1969. *Felt Capillary Structure and Water Removal*. Pulp and paper Magaine, vol. 70, No. 3 (Feb. 1969), pp. 58-62.

Wahlstrom, B. 1969. *Our Present Understanding of the Fundamentals of Pressing*. Abbreviated from Pulp & Paper Magazine of Canada, vol. 70, No. 10 (Oct. 3, 1969), pp. 76-96.

Wiseman, Nick. *The Effect of Felt Properties on the Pressing of Paper*. Pulp and Paper Canada, vol. 77, No. 9 (Sep. 1978), pp. T149-T153.

Bliesner, William C. 1978. *Sheet Water Removal In a Press: the Role of Wet Felt Properties*. Pulp and Paper, vol. 52, No. 11 (Oct. 1978), pp. 76-79.

Beck, David A. 1986. *Re-examining Wet Pressing Fundamentals: a Look Inside the Nip Using Dynamic Measurement*. From Proceedings TAPPI Engineering Conference (Atlanta, GA: Sep. 22-25, 1986), Book 1, pp. 105-115.

Palokangas, Antti. 1990. *Press Felt to Increase Dryness by Avoiding Rewetting*. Paper presented at Modem Technologies in Pressing and Drying, Pira, (Bournemouth, UK, Nov. 6-8, 1990, vol. 1), 8 pp.

Talja. R.; Honkalampi, P. 1994. *Compressibility and Flow Resistance of Porous Medium*. Paper presented at 80th Annual Meeting Technical Section, Canadian Pulp and Paper Association (Montreal, QC, Feb. 1-2, 1994), Preprints A, pp. A187-A190.

Antos, Dave. 1995. *Paper Machine Clothing Developments Aimed at Increased Production and Quality*. Paper Age, (Jun. 1995), pp. 10-14.

Mercer, Colin. 1998. *Use of Membrane Composites in Press Felts Enhance Pressing Efficiency*. Paper presented at $84_{th}$ Annual Meeting Technical Section, Canadian Pulp and Paper Association (Montreal, QC, Jan. 27-30, 1998), Preprints B, pp. B197-B204.

Shidara, Toyohisa. 2000. *Roles of press felt in press section of paper machine—dewatering mechanism and felt design*. Japan Tappi Journal, vol. 54, No. 5 (May 2000), pp. 22-28.

Patterson, B. 2003. *Enhanced Water Removal Pressing*. Paper presented at 89th Annual Meeting Technical Section, Pulp and Paper Technical Association of Canada, (Montreal, QC, Canada, 27-30 Jan. 2003), session 4B-2, 5 pp. Montreal, Canada.

* cited by examiner

PRESS FELT WITH BASE FABRIC LAYER WHICH INCLUDES REGENERATED CELLULOSIC FIBERS

CROSS-REFERENCE TO RELATED APPLICATIONS

The present application claims the benefit of U.S. Provisional Application No. 60/532,194, filed on Dec. 23, 2003, which is incorporated by reference herein as if fully set forth.

BACKGROUND

The present invention relates to an improved press felt for use on a papermaking machine. More particularly, the invention relates to press felts having a base fabric layer formed at least partially from multifilament yarns that include regenerated cellulosic fibers in order to improve the dewatering capability of the felt.

Press felts are endless belts which may contain a seam and which are used to convey an embryonic paper web from the forming section, through the press and into the dryer section of a papermaking machine so as to dewater and ultimately dry the paper product so that it is suitable for use. In the press section, at least one press nip is typically provided between either a pair of rotating cylindrical rollers, or a roller and concave shoe. The embryonic paper web passes through the at least one press nip laid either upon a single felt, or sandwiched between at least two press felts. As the web passes through the at least one press nip, water is expressed from it and passes into the at least one press felt.

Papermaker's press felts are well known. See, for example, U.S. Pat. No. 4,199,401 to Liu et al., U.S. Pat. No. 4,356,225 to Dufour, U.S. Pat. No. 4,414,263 to Miller et al., U.S. Pat. No. 4,806,413 to Penven, U.S. Pat. No. 5,360,656 to Rexfelt et al., and U.S. Pat. No. 5,864,931 to Best et al. These felts are usually comprised of a woven base fabric (typically formed of nylon or similar polymeric yarns) to which is attached, generally by needling, at least one layer of a pre-tacked staple fiber web, commonly referred to as a batt. Typical press felt batts will usually include between one and about 5 or more layers of a pre-tacked staple fiber web needled onto a first planar surface of the base fabric (usually the surface which, when in use, will be in contact with the paper sheet, and is hereafter referred to as the "PS") to form a PS batt, and from none to one or more layers needled to the opposite planar surface (which when in use will be in contact with the equipment of the paper machine, and is hereafter referred to as the "MS") to form the MS batt. The staple fibers used to form either or both the MS and PS batt are typically made from one or more nylons, polyesters or other polymeric materials such as are commonly employed in the manufacture of industrial textiles.

The batt provides a smooth surface for the paper web and a void volume into which water, which has been expressed from the paper web at the press nip, can be received. The base fabric provides some additional void volume, as well as a stable structure to which the batt can be attached. The base fabric is typically comprised of interwoven polymeric monofilament or multifilament yarns to which the batt is attached, generally by needling or other entanglement process such as is known in the art.

After the paper web has been pressed in at least one nip in the press section, it will still contain an appreciable amount of water, as much as from 30% to about 60% or more by weight. This remaining water must now be removed in the dryer section of the papermaking machine in order to provide a paper product. The final drying of the paper product is typically carried out by evaporative means, which requires a large amount of energy. This adds substantially to the cost of manufacturing the paper product. Generally, a 1% increase in the dryness of the sheet exiting the press section will translate into about a 4% energy savings in the dryer section. It is also possible that the speed of the paper machine may have to be reduced or at least limited due to the evaporative capacity of the dryer section.

Thus, it would be highly desirable if the water removal characteristics of the press felts could be improved so as to increase the amount of water they are capable of transporting away from the paper product as it passes through the press section.

It has been known to use regenerated cellulosics such as rayon as a component of papermaking fabric batt materials. However, such use has generally been restricted to certain specific circumstances. One known application provided an article of paper machine clothing for a press section of an impulse drying machine having a paper contacting surface layer which included a thermal barrier with sheet release properties, a base structure layer, and at least one intermediate layer. This intermediate layer could include fine denier fibers and/or hydrophilic fibers such as wool, cotton and regenerated cellulosics. Fabrics constructed in this manner and evaluated on a pilot scale impulse drying machine operating at 205° C. were reported to have achieved 4 to 5 percentage points of added dryness in the sheet. However, the intermediate layer was heat shielded, and the improved drying appears to have been mainly due to the high drying temperature of about 205° C. This was a press fabric for use at temperatures well above the normal operating temperature range of press sections, which typically run between about 40° C. and about 80° C., and clearly involved a different application.

Another known felt included a so-called "flow control" layer located between the batt and base to "impede rewetting of the paper web" as it exits the press nip. This flow control layer was reported to be formed of a spunbonded filamentary nylon material which is noncircular in cross-section (such as trilobal). It was also noted that the flow control layer could be formed from various materials, including rayon. However, a hydrophobic treatment was imparted to the flow control layer to prevent water absorption.

Another known press felt has been reported that includes a high proportion of fibrillatable fibers located in at least the PS surface of the batt so as to provide a relatively fine sheet supporting surface for the paper web. The PS surface was indicated as being formed from fibers which are as fine as possible (below 1 denier in size). These fine fibers occur as a result of the fibrillation of relatively larger regenerated cellulosic fibers (e.g. >1 denier in size) due to hydroentanglement or mechanical pressure.

A transfer fabric has also been known that includes a base structure and a fiber batt layer which is impregnated with a polymer matrix. The batt fibers differ from one another with respect to their surface properties so that the PS surface of the belt facing the web has both hydrophilic and hydrophobic areas.

The vast majority of press felts which are manufactured for, and are in use in paper mills today, consist of 100% nylon staple fiber in at least the batt, mainly due to its abrasion resistance, resiliency and tenacity.

SUMMARY

In accordance with the present invention, a press felt for use in the press section of a papermaking machine is provided that includes a base fabric layer comprising interwoven yarns that extend generally in a cross direction (CD) and a machine direction (MD) with respect to the fabric orientation when in use. At least a portion of either or both the MD and CD yarns comprise a regenerated cellulosic material. A layer of a staple fiber batt material is connected to the base fabric layer. The press felt has a paper side surface (PS) which when in operation is in contact with a paper web conveyed thereon and a machine side surface (MS) which contacts various press section components.

In another aspect of the invention, the staple fiber batt material is comprised of between 20% to 100% by weight of a regenerated cellulosic staple fiber having a denier from at least about 1 to about 44, and from 80% to 0% by weight of a polymeric staple fiber. At least a portion of the regenerated cellulosic staple fibers are located at the PS of the press felt.

In another aspect of the invention, a scrim formed of a regenerated cellulosic product, in particular viscose rayon, is incorporated in the batt of the press felt. The scrim can comprise a woven or non-woven sheet that is incorporated between layers of staple fiber batt material or between the base fabric and a first layer of staple fiber batt material.

DETAILED DESCRIPTION OF THE PREFERRED EMBODIMENTS

Figure 1:
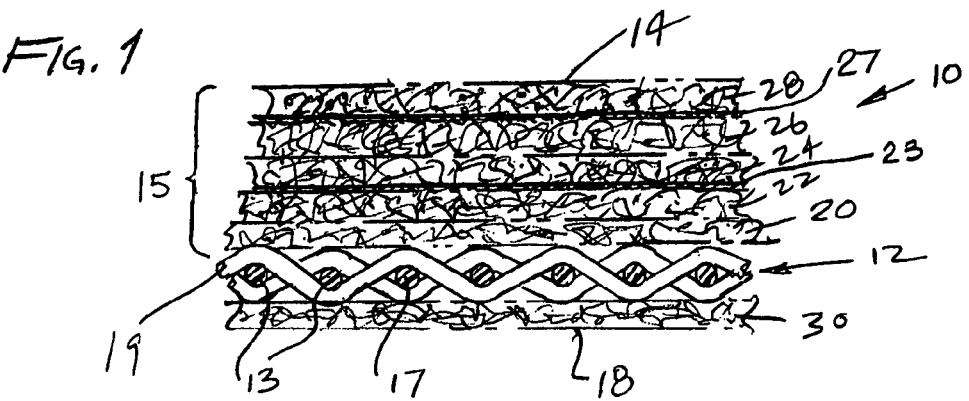
FIG. 1 is a schematic cross-section of a press fabric being constructed in accordance with the teachings of the invention.

Certain terminology is used in the following description for convenience only and is not considered limiting. Words such as "up", "down", "top", and "bottom" designate direction in the drawings to which reference is made. This terminology includes the words specifically noted above, derivatives thereof and words of similar input. Additionally, the terms "a" and "one" are defined as including one or more of the referenced item unless specifically noted. The following abbreviations are also used herein: MS—"machine side"; PS—"paper side"; MD—"machine direction"; and CD—"cross direction". As used herein, "scrim" is defined as a light weight woven or nonwoven textile such as a mesh or a similar fabric.

Figure 2:
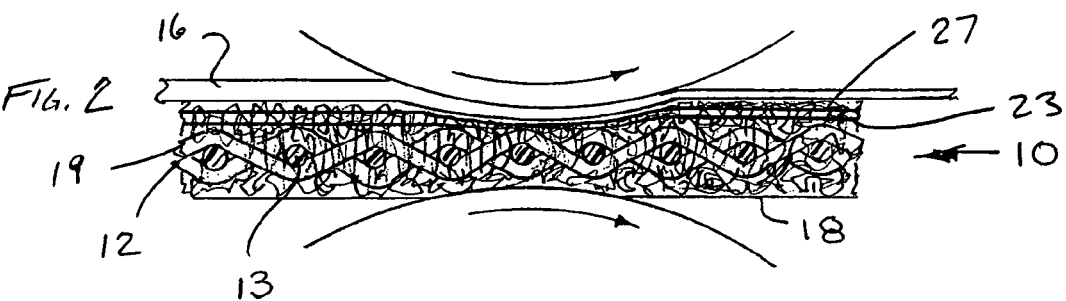
FIG. 2 is a cross-sectional view showing the press fabric with a paper web being formed thereon passing through the nip of two press rolls in the press section of a papermaking machine.

Referring to FIG. 1, a press felt 10 for use in the press section of a papermaking machine in accordance with the present invention is schematically illustrated. The press felt 10 includes a base fabric layer 12 and at least one layer of a staple fiber batt material 15 connected to the base fabric layer 12. The press felt has a PS 14 which when in operation is in contact with the paper web 16, as shown in FIG. 2, and a MS 18 which contacts various press section components, such as the lower press roll shown in FIG. 2.

The base fabric layer 12 can be a flat or endlessly woven fabric of the type known to those skilled in the art. Alternatively, the base fabric layer can be a spirally wound construction in which a strip of material having a width less than an overall width of the press felt 10 is helically or spirally wound to achieve a desired width of the press felt 10, and the adjacent edges of the wound strip are connected together, for example, as disclosed in U.S. Pat. Nos. 5,360,656 or 5,268,076.

Preferably, at least some of the CD yarns 13 of the base fabric 12 are at least partially comprised of a regenerated cellulosic material. As shown in FIG. 1, the CD yarns can comprise monofilaments 17 comprised of a regenerated cellulosic material.

Figure 3:
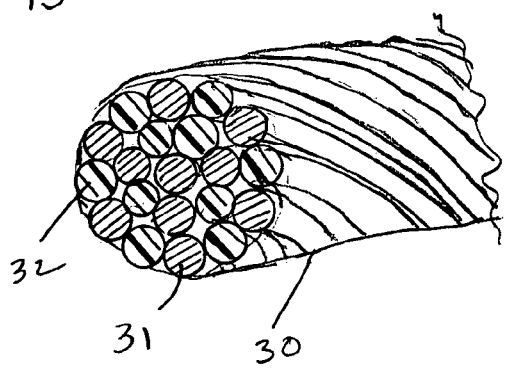
FIG. 3 is an enlarged view of a cross-direction multifilament yarn used in the press felt according to the present invention.

Alternatively, as shown in FIG. 3, the CD yarns 13 can be formed as multifilaments 30 that include regenerated cellulosic fiber filaments 31 which may be mixed with polymeric fiber filaments 32. The filaments 31, 32 preferably have an individual dtex of about 6 to 15. The multifilament preferably has a weight in a range of 200 to 400 tex. In a preferred embodiment, the multifilaments are either entirely comprised of viscose rayon or are comprised of a rayon component blended with e.g. nylon, or some other suitable polymer. Alternatively, the regenerated cellulosic can comprise cotton, flax, hemp or jute or similar fibers.

Figure 4:
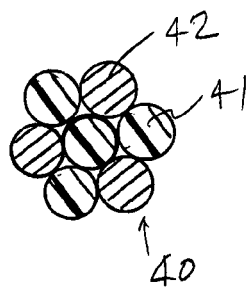
FIG. 4 is an enlarged view of a cross-direction cabled monofilament used in the press felt according to the present invention.

Additionally, as shown in FIG. 4, the CD yarns can also be formed as cabled monofilaments. The cabled monofilaments 40 preferably include monofilaments 41 formed of a polymer and monofilaments 42 formed of a regenerated cellulosic material, such as viscose rayon. The individual monofilaments 41, 42 preferably have a diameter on the order of 0.05 to 0.3 mm, and more preferably have a diameter of about 0.2 mm. The number of monofilaments used in each "cable" 40 is preferably on the order of 4 to 10. However, the size and number of monofilaments can be varied based on the particular application.

Preferably, at least some of the CD yarns 13 comprise the monofilaments 17, multifilaments 30 or cabled monofilaments 40 that are comprised at least partially of the regenerated cellulosic material, so that approximately 20% to 100% by weight of the CD yarns 13 is comprised of the regenerated cellulosic material. In order to maintain the strength of the base fabric 12, it is preferred that at least some of the CD yarns 13 are comprised at least partially of a polymeric material, such as nylon. Alternatively, certain ones of the CD yarns 13 can be formed entirely of a polymeric material.

Referring again to FIG. 1, it is also possible to incorporate a regenerated cellulosic material into the MD yarns 19, through the use of multifilaments or cabled monofilaments, as discussed above. In such applications, it is preferred that at least some of the MD yarns 19, or some of the filaments in MD miltifilaments or some of monofilaments in MD cabled monofilaments comprise nylon or another suitable polymeric material having the desired strength and mechanical properties required to provide the necessary strength and elongation resistance required for a press felt. While the base fabric 12 in FIGS. 1–5 is illustrated as being a flat woven or a spiral wound construction, those skilled in the art will recognize from the present disclosure that if the fabric were endless woven, then the directions of the MD and CD would be reversed.

Preferably, the base fabric 12 according to the invention includes from 10% to 80% of the regenerated cellulosic material. More preferably, the base fabric 12 comprises from 20% to 50% of the regenerated cellulosic material. It is believed that this construction of the base fabric 12 will aid in the dewatering performance of the press felt 10. Those skilled in the art will recognize that the particular weave and construction of the base fabric 12 can be varied based on the particular application, and the base fabric 12 in accordance with the invention is not limited to a particular weave or construction method.

In order to further enhance the dewatering properties of the press felt 10, the at least one layer of staple fiber batt 15 preferably comprises a plurality of layers of staple fiber batt material 20, 22, 24, 26, 28 located on the PS of the base fabric 12. One or more layers of staple fiber batt material 30 may also be located on the MS of the base fabric 12, as shown in FIG. 1. The staple fiber batt material is preferably comprised of between 20% to 100% by weight of a regenerated cellulosic staple fiber and from 80% to 0% by weight of a polymeric staple fiber. These staple fiber batt material layers are preferably carded into batt layers having a desired density and connected to the base fabric layer 12 by a needling process of the type known in the art. Preferably, the staple fabric batt material layers 20, 22, 24, 26, 28 are comprised of between 20% to 80% by weight of the regenerated cellulosic staple fabric and from 80% to 20% by weight of the polymeric staple fabric. More preferably, the staple fabric batt material 20, 22, 24, 26, 28 is comprised of between 50% to 80% by weight on the regenerated cellulosic staple fabric and from 50% to 20% by weight of polymeric staple fabric. In a most preferred embodiment which has been subject to extensive testing, the staple fiber batt material layers 20, 22, 24, 26, 28 are comprised of about 50% by weight of the regenerated cellulosic staple fabric and about 50% by weight of the polymeric staple fabric. The separate layers of staple fiber batt material 20, 22, 24, 26, 28 are represented in FIG. 1 prior to needling where the distinct layers can be seen. After needling, as shown in FIG. 2, a uniform more dense press felt is formed with the fibers being anchored into the base fabric 12 through the needling process.

While the blend of regenerated cellulosic and polymeric staple fibers in the batt material layers 20, 22, 24, 26, 28 is preferred, those skilled in the art will recognize that the batt material layers can be made entirely from polymeric stable fibers for use in connection with the base fabric 12.

In a preferred embodiment, the regenerated cellulosic staple fiber in the staple fiber batt material 20, 22, 24, 26, 28 has a dtex from at least about 1.1 to about 44. When a plurality of layers of staple fiber batt material 20, 22, 24, 26, 28 are utilized, as shown in FIG. 1, it is preferred that the regenerated cellulosic staple fiber in the layer of staple fiber batt 28 on the PS of the press felt 10 has a smaller size than the staple fiber of batt material of an intermediate layer of the staple fiber batt material 20, 22 adjacent to the base fabric. In one preferred embodiment, the regenerated cellulosic staple fibers in the PS batt layers 26, 28 have a dtex of about 2 to about 6 and the regenerated cellulosic fibers of the intermediate batt layer 20, 22 have a dtex of 8 to about 20. While these regenerated cellulosic staple fiber sizes have proven successful, applicants have also achieved improvements in the way of utilizing regenerated cellulosic staple fibers of the same size in each of the layers of staple fiber batt material 20, 22, 24, 26, 28. Accordingly, the sizes can be adjusted based on the particular application.

Preferably, when the plurality of staple fiber batt material layers 20, 22, 24, 26, 28 are used, all of the PS batt layers are comprised of a blend from about 20% to about 100% by weight as the regenerated cellulosic staple fiber and from about 80% to about 0% by weight of the polymeric stable fiber. It has been found that by providing a uniform mix of the regenerated cellulosic staple fibers throughout the batt material layers, better dewatering results are obtained. However, it would also be possible to provide one or more of the intermediate layers formed entirely of a polymeric staple fiber near or adjacent to the base fabric 12, if desired.

It has been found in connection with the invention that if the regenerated cellulosic staple fibers and the polymeric staple fiber yarns have too small of a size, then the dewatering capability of the fabric is adversely affected. Accordingly, in the most preferred embodiments of the invention, the staple batt fibers have a dtex of at least 3.

To achieve improved dewatering, it is preferred that at least a portion of the regenerated cellulosic staple fibers are located at the PS 14 of the press felt 12. The PS staple fiber batt material layers 26, 28 also generally comprise a uniform distribution of the regenerated cellulosic staple fibers with the polymeric staple fiber. This blending can take place through mixture of the staple fibers prior to the fibers being carded to form the batts. In one preferred embodiment the polymeric staple fibers and the regenerated cellulosic staple fibers have approximately an equal size. For example, both the regenerated cellulosic staple fibers and the polymeric staple fibers have a dtex of from about 3 to about 6.

The regenerated cellulosic staple fiber material is preferably viscose rayon, and may be solid, hollow or otherwise shaped, such as Viloft® available from Courtaulds. It has been found in experimental trials that regenerated cellulosic fibers which are resistant to fibrillation are preferred for this use. Polymeric staple fibers comprised of polypropylene, polyethylene terephthalate and the like, may be suitable for blending in the present invention.

Preferably, the regenerated cellulosic staple fibers are Merge 8142 viscose rayon having a dtex of about 3.0 available in about 2 inch lengths from Lenzing Fiber Corp. of Charlotte, N.C. Similar viscose rayon staple fibers may provide comparable results.

Preferably, the polymeric staple fiber is comprised of one or more of nylon 6, nylon 6/6, nylon 6/10, nylon 6/11 or nylon 6/12. Alternatively, it may comprise one of polypropylene (PP), polyethylene terephthalate (PET) or other polymeric fiber materials such as commonly used in industrial textiles. Preferably, the dtex of both is at least about 3, and the regenerated cellulosic staple fiber is viscose rayon. Even more preferably, the regenerated cellulosic fiber is non-fibrillatable, and the regenerated cellulosic fiber is flame retardant.

In one embodiment, the staple fiber batt material includes a melt fusible polymeric bi-component staple fiber. This allows the batt material to not only be anchored to the base fabric 12 by needling but also allows heat treatment of the fabric to further lock the fibers of the staple fiber batt material in place to reduce shedding.

Preferably, a weight of the regenerated cellulosic staple fiber in the staple fiber batt material in the press felt is from about 75 to about 1000 gsm (grams per square meter). More preferably, a weight of the regenerated cellulosic staple fiber in the staple fiber batt material in the press felt is about 300 to about 700 gsm. In a most preferred embodiment of the invention, a weight of the regenerated cellulosic fiber in the staple fiber batt material for the press felt is from about 350 to about 700 gsm. This weight is preferably achieved by providing multiple layers of staple fiber batt material 20, 22, 24, 26, 28 on the PS 14 of the base fabric 12.

Additionally, one or more layers of staple fiber batt material 30 which may be comprised of polymeric fibers or regenerated cellulosic staple fibers is/are provided on the MS 18. Each of these layers is typically in the range of 50 to 100 GSM. By constructing the felt with multiple layers of staple fiber batt material 20, 22, 24, 26, 28 and 30, further variations in construction can be obtained such as varying the dtex of the PS layers 26, 28 of staple fiber batt material in comparison to the intermediate layers 20, 22, 24. However, at least each of the PS layers include some of the cellulosic staple fiber batt material.

Figure 5:
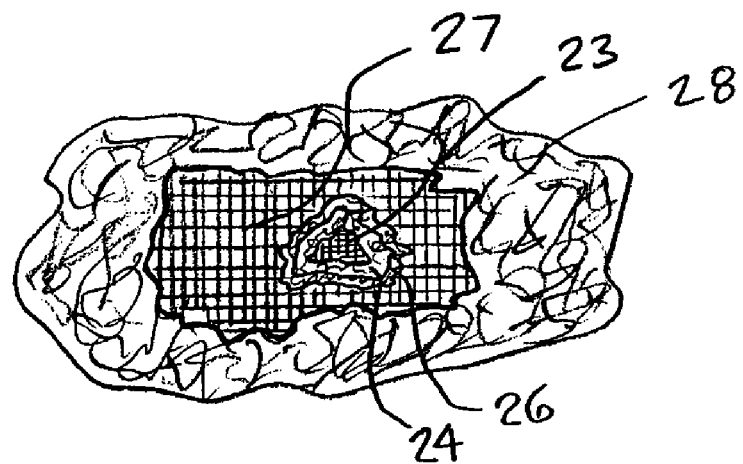
FIG. 5 is a top view, partially broken away, showing some of the layers of batt staple fibers and the scrim in the PS batt of the press felt according to one embodiment of the invention.

Referring to FIGS. 1 and 5, in another embodiment of the invention, a scrim 27 formed at least partially of a regenerated cellulosic material can be located between at least two of the layers of staple fiber batt material 26, 28. As noted above, the batt material 20, 22, 24, 26, 28 can be made entirely of polymeric staple fibers, or can be a blend of regenerated cellulosic staple fibers and polymeric staple fibers. Additional scrim(s) 23 can be located between other layers of the staple fiber batt material 20, 22, 24, 26, 28 and or the layer of staple fiber batt material 20 adjacent to the base fabric layer 12 and the base fabric layer 12. Additionally, multiple scrims can be located adjacent to one another in the batt stratification.

In the preferred embodiment, the regenerated cellulosic fibers in the scrim 23, 27 have a dtex from at least about 1.1 to about 44. When a plurality of scrims 23, 27 are utilized, as shown in FIG. 1, it is preferred that the regenerated cellulosic fibers in the scrim 27 adjacent to the layer of staple fiber batt 28 on the PS of the press felt 10 has a smaller size than the fiber of the scrim 23 located between intermediate layers of the staple fiber batt material 20, 22, 24, 26 and or adjacent to the base fabric 12. In one preferred embodiment, the regenerated cellulosic fibers in the scrim 27 have a dtex of about 2 to about 6 and the regenerated cellulosic fibers of the scrim 23 have a dtex of 8 to about 20. While these regenerated cellulosic fiber sizes are believed to yield improvements in dewatering, applicants have also achieved improvements by utilizing regenerated cellulosic fibers of the same size in each of the scrims 23, 27. Accordingly, the sizes can be adjusted based on the particular application.

As shown in FIG. 5, in one embodiment the scrims 23, 27 are formed as a woven fabric made at least partially from regenerated cellulosic fibers. The scrims 23, 27 can include other types of polymeric fibers, such as polyamides, and in particular polyamide 6 or polyamide 6/6. The regenerated cellulosic fibers preferably extend in the CD, or the CD yarns are formed of twisted fibers, at least some of which are regenerated cellulosic fibers. Alternatively, the regenerated cellulosic fibers can extend in both the CD and MD. Preferably, the scrim 23, 27 includes from 10% to 100% of the regenerated cellulosic fibers, and more preferably from 20% to 80% regenerated cellulosic fibers. While the scrims 23, 27 are illustrated with the yarns of the woven material oriented generally in the CD and MD, in another embodiment of the invention when two or more scrims 23, 27 of woven fabric are utilized, at least one of the scrims is oriented so that the yarns of the woven yarn system are oriented from 30° to 60° with respect to the MD and CD of the press felt 10, and more preferably at 45° with respect to the MD and CD. It is also possible for the scrim to be located at from about 1° to about 10° with respect to the MD in the case of spiral winding a scrim of a narrow width relative to the press felt width. The scrims 23, 27 can be located between any two layers of the batt material, or attached to the PS or MS surface of the press felt 10.

The scrim 23, 27 of woven material can be manufactured using the same techniques that are known to those skilled in the art by flat or endless weaving, and can be produced the full width of the press felt 10, or can be produced as a narrower band of material that is spirally wound onto the press felt 10 as it is being formed.

Figure 6:
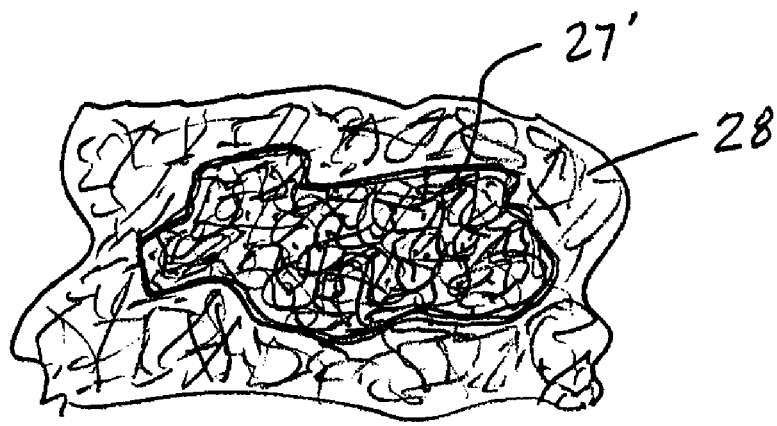
FIG. 6 is a top view, partially broken away, showing some of the layers of batt staple fibers and a non-woven scrim in the PS batt of the press felt according to the present invention.

Alternatively, in another embodiment of the invention as shown in FIG. 6, the at least one scrim 27', and preferably all of the scrims 27', utilized in the press felt 10 are formed of a non-woven mesh that includes at least some fibers formed of a regenerated cellulosic material. The non-woven mesh is preferably formed through a process wherein the fibers are blended and randomly aligned into a web by an airflow, and can be connected together through binding agents in order to form a non-woven mesh. Preferably, from 10% to 100% of the fibers are regenerated cellulosic material, such as viscose rayon. Alternatively, the fibers are a blend of regenerated cellulosic fibers and polymeric fibers in a ratio of from about 80% to 20% regenerated cellulosic fibers to 20% to 80% polymeric fibers.

It has been found in connection with the invention if the regenerated cellulosic staple fibers of the scrim have too small of a size that the dewatering capability of the fabric is adversely affected. Accordingly, in the most preferred embodiments of the invention, the regenerated cellulosic fibers of the scrim 23, 27 have a dtex of at least about 3.

The regenerated cellulosic fiber material is preferably viscose rayon, and may be solid, hollow or otherwise shaped, such as Viloft® available from Courtaulds. It has been found in experimental trials that regenerated cellulosic fibers which are resistant to fibrillation are preferred for this use.

Alternatively, the scrim 23, 27 can contain bi-component fibers having an outer sheath made of a low melting point polymer, and an inner core made of a higher melt point polymer or a regenerated cellulosic material. Upon heat treatment of the press felt 10, the low melt point sheath material at least partially melts and helps to retain the other fibers in the batt layers in place.

Preferably, a weight of the regenerated cellulosic fibers in the PS scrim(s) in the press felt is from about 75 to about 1000 GSM (grams per square meter).

Additionally, one or more layers of staple fiber batt material 30 which may be comprised of polymeric fibers is/are provided on the MS 18. Additional scrim(s) of the regenerated cellulosic material can also be located between these MS batt material layer(s) 30 and the base fabric layer 12, depending on the particular application.

In accordance with the invention, further improvements in reducing re-wetting of the paper web 16 after it has passed through the nip of the press rolls are provided if a hydrophobic surface treatment is applied to at least one of the base fabric 12, the batt 15, the scrim 23, 27 and/or the regenerated cellulosic fibers in the base fabric 12, the batt 15 or scrim 23, 27. Alternatively, the hydrophobic surface treatment can be applied to the press felt 10. While this appears counterintuitive, it is believed that improved capillary action for removing water from the PS of the press felt 10 results from the hydrophobic treatment. In testing conducted on press felts in accordance with the invention, hydrophobic treatment resulted in approximately 1% better moisture removal from the paper web 16.

Experimental Trials

An experimental trial was conducted at a paper mill to determine the dewatering capacity and performance characteristics of a felt which utilized regenerated cellulosic fibers in the batt. The press felt consisted of two layers of a narrow base fabric whose basis weight was about 600 gsm (grams per square meter), to which 5 layers of a 75 gsm basis weight, 10 dtex nylon batt material having a basis weight of about 375 gsm (i.e.: 5×75 gsm) was needled; a further 4 layers of 3.3 dtex fiber batt material consisting of a blend of about 50% by weight nylon-6 and about 50% by weight of viscose rayon material was needled onto the outer most of this first 5 layers. The viscose rayon was Merge 8142 available from Lenzing Fibers Corp. of Charlotte, N.C. The felt was assembled using normal industrial textile assembly methods consistent with the manufacture of papermakers' press felts and then installed in the first press position (i.e. the press closest to the forming section) of a papermaking machine. A control felt, which did not include any regenerated cellulosic fibers in the batt, was run the day before the experimental installation. The machine was run at a speed of about 2,750 fpm (feet per minute). The experimental and control fabrics were exposed to identical physical conditions of furnish, temperature, machine speed, etc.

The consistency of the sheet was measured immediately downstream of the press nip in the center of the sheet. Measurements were made by means of "grab sampling" portions of the pressed sheet whereby a metal cup was used to remove a sample of the sheet immediately following the first press nip. The samples were each weighed, then oven dried and weighed again to determine their moisture content. We found that, on average, the control felt provided about 42.3% consistency as compared to 46.8% consistency for the trial felt. This represents an improvement in sheet consistency following the nip of 4.5%. The consistency was measured at normal operating temperatures, between 40 and 80 degrees C., for the press environment.

TABLE 1

Laboratory Trials

| Sample No. | Fabric Construction | % Consistency | Improvement |
|---|---|---|---|
| | Trial # 1 | | |
| N161 | PS: 150 gsm 3.3 dtex nylon batt<br>PS: 8 layers 50 gsm Rayon Scrim<br>2 layers spirally wound woven polymeric base fabric<br>MS: 1 layer 100 gsm 6.7 dtex nylon batt | 54.40% | na |
| | Trial # 2 | | |
| N167A | PS: 150 gsm 3.3 dtex nylon batt<br>PS: 2 layers 50 gsm Rayon scrim<br>PS: 200 gsm 15 dtex nylon batt<br>2 layers spirally wound woven polymeric base fabric<br>MS: 1 layer 100 gsm 15 dtex nylon batt | 46.20% | |
| | | | 1.50% |
| N167B Control | PS: 150 gsm 3.3 dtex nylon batt<br>PS: 3 layers 100 gsm 15 dtex nylon batt<br>2 layers spirally wound woven polymeric base fabric<br>MS: 1 layer 100 gsm 15 dtex nylon batt | 44.70% | |
| | Trial # 3 | | |
| N169A | PS: 150 gsm 3.3 dtex nylon batt<br>PS: 4 layers 50 gsm Rayon scrim<br>PS: 200 gsm 15 dtex nylon batt<br>2 layers spirally wound woven polymeric base fabric<br>MS: 1 layers 100 gsm 15 dtex batt | 50.60% | |
| | | | 6.00% |
| N169B Control | PS: 150 gsm 3.3 dtex nylon batt<br>PS: 3 layers 100 gsm 15 dtex nylon batt<br>2 layers spirally wound woven polymeric base fabric<br>MS: 1 layer 100 gsm 15 dtex nylon batt | 44.60% | |
| | Trial # 4 | | |
| N171A | PS: 180 gsm 1.7 dtex nylon batt<br>PS: 4 × 50 gsm Rayon scrim<br>PS: 200 gsm 15 dtex nylon batt<br>2 layers spirally wound woven polymeric base fabric<br>MS: 1 layer 100 gsm 15 dtex nylon batt | 53.40% | |
| | | | 7.10% |
| N171B Control | PS: 150 gsm 3.3 dtex nylon batt<br>PS: 300 gsm 15 dtex nylon batt<br>2 layers spirally wound woven polymeric base fabric<br>MS: 1 layer 100 gsm 15 dtex nylon batt | 46.30% | |
| | Trial # 5 | | |
| N192A | PS: 150 gsm 3.3 dtex nylon batt<br>PS: 100 gsm Hand Carded 3.3 dtex Rayon<br>PS: 300 gsm 15 dtex nylon batt | 52.00% | |

TABLE 1-continued

Laboratory Trials

| Sample No. | Fabric Construction | % Consistency | Improvement |
|---|---|---|---|
| | 2 layers spirally wound woven polymeric base fabric<br>MS: 100 gsm 15 dtex nylon batt | | 6.90% |
| N192B Control | PS: 150 gsm 3.3 dtex nylon batt<br>PS: 100 gsm 15 dtex nylon batt<br>PS: 300 gsm 15 dtex nylon batt<br>2 layers spirally wound woven polymeric base fabric<br>MS: 100 gsm 15 dtex nylon batt | 45.10% | |
| N192C Control | PS: 150 gsm 3.3 dtex nylon batt<br>PS: 100 gsm 3.3 dtex nylon batt<br>PS: 300 gsm 15 dtex nylon batt<br>2 layers spirally wound woven polymeric base fabric<br>MS: 100 gsm 15 dtex nylon batt<br>Trial # 6 | 48.50% | 3.50% |
| N192E | PS: 150 gsm 3.3 dtex nylon batt<br>PS: 300 gsm carded 3.3 dtex Rayon<br>PS: 100 gsm 15 dtex nylon batt<br>2 layers spirally wound woven polymeric base fabric<br>MS: 100 gsm 15 dtex nylon batt | 55.00% | 5.90% |
| N192F Control | PS: 150 gsm 3.3 dtex nylon batt<br>PS: 300 gsm 3.3 dtex nylon batt<br>PS: 100 gsm 15 dtex nylon batt<br>2 layers spirally wound woven polymeric base fabric<br>MS: 100 gsm 15 dtex nylon batt<br>Trial # 7 | 49.10% | |
| N193 | PS: 150 gsm 3.3 dtex nylon batt<br>PS: 300 gsm carded 1.3 dtex Rayon<br>PS: 100 gsm 15 dtex nylon batt<br>2 layers spirally wound woven polymeric base fabric<br>MS: 100 gsm 15 dtex nylon batt | 55.20% | 2.50% |
| N193B Control | PS: 150 gsm 3.3 dtex nylon batt<br>PS: 270 gsm 1.7 dtex Grilon M369 nylon<br>PS: 100 gsm 15 dtex nylon batt<br>2 layers spirally wound woven polymeric base fabric<br>MS: 100 gsm 15 dtex nylon batt<br>Trial # 8 | 52.70% | |
| N194A | PS: 150 gsm 3.3 dtex nylon batt<br>PS: 150 gsm carded 3.3 dtex Rayon<br>PS: 200 gsm 15 dtex nylon batt<br>2 layers spirally wound woven polymeric base fabric<br>MS: 100 gsm 15 dtex nylon batt | 52.40% | 5.40% |
| N194B Control | PS: 150 gsm 3.3 dtex nylon batt<br>PS: 150 gsm 3.3 dtex nylon<br>PS: 200 gsm 15 dtex nylon batt<br>2 layers spirally wound woven polymeric base fabric<br>MS: 100 gsm 15 dtex nylon batt<br>Trial # 9 | 47.00% | |
| N195A | PS: 150 gsm 3.3 dtex carded rayon fiber<br>PS: 150 gsm 3.3 dtex nylon batt<br>PS: 200 gsm 15 dtex nylon batt<br>2 layers spirally wound woven polymeric base fabric<br>MS: 100 gsm 15 dtex nylon batt | 51.60% | 5.80% |
| N195B Control | PS: 150 gsm 3.3 dtex nylon batt<br>PS: 150 gsm 3.3 dtex nylon batt<br>PS: 200 gsm 15 dtex nylon batt<br>2 layers spirally wound woven polymeric base fabric<br>MS: 100 gsm 15 dtex nylon batt<br>Trial # 10 | 45.80% | |
| N196A | PS: 200 gsm 6.7 dtex nylon<br>PS: 300 gsm 3.3 dtex carded rayon fiber<br>2 layers spirally wound woven polymeric base fabric<br>MS: 100 gsm 15 dtex nylon batt | 52.80% | 3.60% |
| N196B Control | PS: 200 gsm 6.7 dtex nylon<br>PS: 300 gsm 3.3 dtex nylon batt<br>PS: 100 gsm 15 dtex nylon batt | 49.20% | |

TABLE 1-continued

Laboratory Trials

| Sample No. | Fabric Construction | % Consistency | Improvement |
|---|---|---|---|
| | 2 layers spirally wound woven polymeric base fabric<br>MS: 100 gsm 15 dtex nylon batt<br>Trial # 11 | | |
| N197A | PS: 300 gsm 3.3 dtex carded rayon fiber<br>PS: 300 gsm 15 dtex nylon<br>1 layer spirally wound polymeric base fabric (Prizm XF Base 705)<br>1 layer full width woven base (Maxxum Base 107) | 55.20% | |
| | | | 8.00% |
| N197B Control | PS: 300 gsm 3.3 dtex carded nylon staple fiber<br>PS: 300 gsm 15 dtex nylon<br>1 layer spirally wound polymeric base fabric (Prizm XF Base 705)<br>1 layer full width woven base (Maxxum Base 107)<br>Trial # 12 | 47.20% | |
| N198A | PS: 75 gsm 3.3 dtex nylon<br>PS: 300 gsm 3.3 dtex carded rayon staple fiber<br>PS: 300 gsm 15 dtex nylon<br>2 layers spirally wound woven polymeric base fabric<br>MS: 100 gsm 15 dtex nylon batt<br>Trial # 13 | 58.10% | na |
| No. 4018101 Full size production trial | PS: 300 gsm 50/50 blend of 3.3 dtex rayon and nylon staple fibers<br>PS: 375 gsm 11 dtex nylon staple fiber batt<br><br>1 layer spirally wound polymeric base fabric (Prizm XF Base 705)<br>1 layer full width woven base (Maxxum Base 107) | 54.20% | |
| | | | 7.00% |
| Full size production control | PS: 300 gsm 3.3 dtex nylon staple fiber<br><br>PS: 300 gsm 15 dtex nylon staple fiber<br>1 layer spirally wound polymeric base fabric (Prizm XF Base 705)<br>1 layer full width woven base (Maxxum Base 107)<br>Trial # 14 | 47.20% | |
| N203A | PS: 75 gsm 3.3 dtex nylon staple fiber<br>PS: 300 gsm 50/50 blend of 3.3 dtex rayon and nylon staple fibers<br>PS: 200 gsm 15 dtex nylon staple fiber<br>2 layers spirally wound woven polymeric base fabric<br>MS: 100 gsm 15 dtex nylon batt | 53.00% | |
| | | | 5.80% |
| N203B Control | PS: 75 gsm 3.3 dtex nylon staple fiber<br>PS: 300 gsm 3.3 dtex nylon staple fiber<br>PS: 200 gsm 15 dtex nylon staple fiber<br>2 layers spirally wound woven polymeric base fabric<br>MS: 100 gsm 15 dtex nylon batt<br>Trial # 15 | 47.20% | |
| Full size production trial | PS: 300 gsm 50/50 blend of 3.3 dtex rayon and nylon staple fiber<br><br>PS: 375 gsm 11 dtex nylon staple fiber batt<br>1 layer spirally wound polymeric base fabric<br>1 layer full width woven base | 46.80% | |

While the preferred embodiments of the invention have been described in detail, the invention is not limited to these specific embodiments described above which should be considered as merely exemplary. Additionally, the various features of the invention described above can be implemented alone or in combination with other features, depending on the particular application. Further modifications and extensions of the present invention may be developed and all such modifications are deemed to be within the scope of the present invention as defined by the appended claims.

The invention claimed is:

1. A press felt for use in the press section of a papermaking machine, the press felt comprising:
a base fabric layer comprising interwoven yarns that extend generally in a cross direction (CD) and a machine direction (MD), wherein at least a portion of at least one of the MD and CD yarns comprise a regenerated cellulosic material; and a layer of a staple fiber batt material connected to the base fabric layer, the staple fiber batt material is comprised of between 20% to 80% by weight of a regenerated cellulosic staple fiber having a dtex from at least about 1.1 to about 44, and from 80% to 20% by weight of a polymeric staple fiber, the press felt having a paper side surface (PS) which when in operation is in contact with a paper web conveyed thereon and a machine side surface (MS) which contacts various press section components.

2. A press felt according to claim 1, wherein at least a portion of the CD yarns comprise multifilaments formed at least partially of filaments of a regenerated cellulosic material having a dtex of at least about 1.1.

3. A press felt according to claim 1, wherein at least a portion of the MD yarns comprise multifilaments formed at least partially of filaments of a regenerated cellulosic material having a dtex of at least about 1.1.

4. A press felt according to claim 1, wherein at least a portion of the CD yarns comprise cabled monofilaments including at least one monofilament element comprised of a regenerated cellulosic material.

5. A press felt according to claim 1, wherein at least a portion of the MD yarns comprise cabled monofilaments including at least one monofilament element comprised of a regenerated cellulosic material.

6. A press felt according to claim 1, wherein at least a portion of the MD and CD yarns comprise multifilaments formed at least partially of filaments of a regenerated cellulosic material having a dtex of at least about 1.1.

7. A press felt according to claim 1, wherein at least a portion of the MD and CD yarns comprise cabled monofilaments including at least one monofilament element comprised of a regenerated cellulosic material.

8. A press felt according to claim 1, wherein at least some of the CD yarns comprise monofilaments formed of the regenerated cellulosic material.

9. A press felt according to claim 1, wherein the at least some of the MD yarns comprise monofilaments formed of the regenerated cellulosic material.

10. A press felt according to claim 1, wherein the at least some of the CD yarns further comprise a polymeric material.

11. A press felt according to claim 10, wherein the regenerated cellulosic material and the polymeric material comprise staple fibers having an approximately equal size.

12. A press felt according to claim 1, wherein the at least some of the MD yarns further comprise a polymeric material.

13. A press felt according to claim 12, wherein the regenerated cellulosic material and the polymeric material comprise staple fibers having an approximately equal size.

14. A press felt according to claim 1, wherein the polymeric staple fibers and the regenerated cellulosic fibers have an approximately equal size.

15. A press felt according to claim 1, wherein the staple fiber batt material layer comprises at least two layers of staple fiber batt matieral, and further comprising a scrim that includes regenerated cellulosic material fibers located on the PS of the press felt between the at least two layers of staple fiber batt material or between the base fabric layer and one of the layers of staple fiber batt material, the regenerated cellulosic material fibers of the scrim having a dtex of from about 1.1 to about 44.

16. A press felt according to claim 15, wherein the scrim comprises between 20% to 80% by weight of the regenerated cellulosic fibers and from 80% to 20% by weight of a polymeric fiber.

17. A press felt according to claim 15, wherein the scrim is a non-woven material.

18. A press felt according to claim 15, wherein the scrim is a woven material.

19. A press felt according to claim 1, wherein a plurality of scrims comprised of the regenerated cellulosic material are located between adjacent batt layers or between one of the batt layers and the base fabric layer.

20. A press felt according to claim 1, wherein the regenerated cellulosic fiber is viscose rayon.

21. A press felt according to claim 1, wherein the regenerated cellulose fiber is non-fibrillatable.

22. A press felt according to claim 1, wherein the batt further comprises a melt fuseable polymeric bi-component fiber.

* * * * *